Nov. 24, 1953

F. M. WOOD, JR 2,660,612

COLOR TELEVISION RECEIVING SYSTEM

Filed Dec. 14, 1949

2 Sheets-Sheet 1

INVENTOR.

Frank M. Wood, Jr.

BY Victor J. Evans & Co.

ATTORNEYS

Nov. 24, 1953 F. M. WOOD, JR 2,660,612

COLOR TELEVISION RECEIVING SYSTEM

Filed Dec. 14, 1949

2 Sheets-Sheet 2

INVENTOR.

Frank M. Wood, Jr.

BY Victor J. Evans & Co.

ATTORNEYS

Patented Nov. 24, 1953

2,660,612

UNITED STATES PATENT OFFICE 2,660,612

COLOR TELEVISION RECEIVING SYSTEM

Frank M. Wood, Jr., Fort Worth, Tex.

Application December 14, 1949, Serial No. 132,820

3 Claims. (Cl. 178—5.4)

This invention relates to television receivers, and in particular means for projecting with the use of a plurality of beams with a beam including each of the three primary colors of the spectrum and a white beam wherein the beams are projected simultaneously producing a picture in color.

The purpose of this invention is to provide a television system in which the receiver produces a picture in complete color or in black and white depending upon the type of transmission of the station to which the receiver is tuned.

Various attempts have been made to provide color in television receiving systems but it has been found difficult to distinguish between color signals. With this thought in mind this invention contemplates a four-beam receiving system for the reception and simultaneous reproduction of four television signals of different frequencies wherein the four-beam tube is used to produce the three primary colors of the spectrum and also a pure white beam, the white beam being used when the receiver is tuned to a station not broadcasting in color.

The object of this invention is, therefore, to provide a television receiving system in which means is provided for simultaneously reproducing four television signals of different frequencies with three of the beams producing the three primary colors of the spectrum and the fourth a pure white beam.

Another object of the invention is to provide a method of reproducing television signals wherein different frequencies produce different colors that may be used in receivers now in use.

A further object of the invention is to provide an improved method of reproducing television signals in colors which is comparatively simple and inexpensive.

Other features and advantages of the invention will appear from the following description taken in connection with the drawings wherein.

Figures 1, 2, 3, 4, 5, 6:
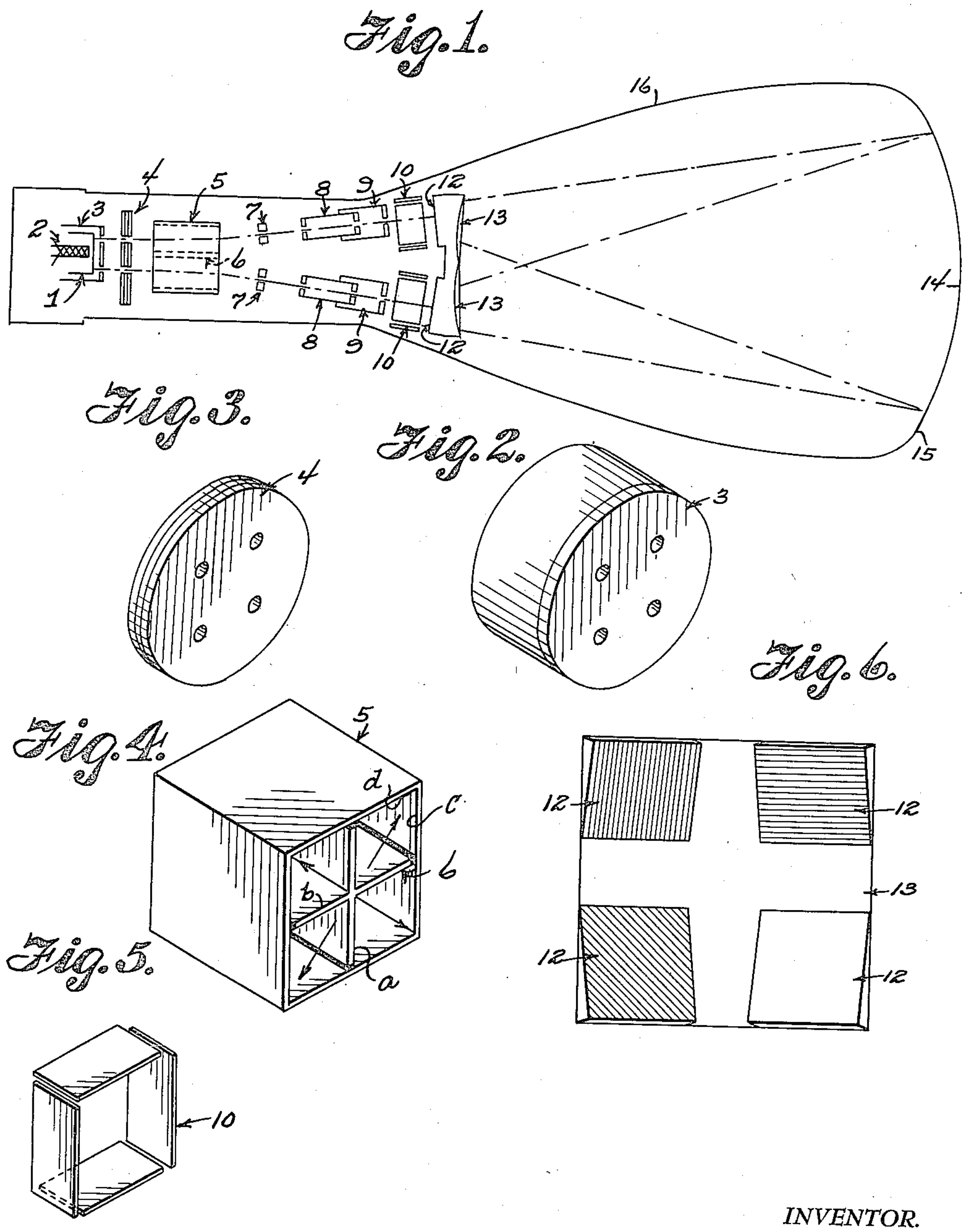
Figure 1 is a view illustrating the elements of the system incorporated in a tube such as a cathode ray tube.
Figure 2 is a view showing a cathode used in the base of the tube and which is provided with a control grid.
Figure 3 is a view showing the accelerating electrode which is spaced from the cathode and control grid.
Figure 4 is a view illustrating the separator through which four longitudinally disposed passages are provided.
Figure 5 is a view illustrating a set of deflection plates positioned to receive beams from the sections of the separator.
Figure 6 is a view showing four separate lenses each of which is coated with a fluorescent material that will emit one of the colors such as red, blue and green and one of which is provided for white.

The electron beams used in this tube are produced by a heated cathode 1. The cathode is a metal cylinder with a heater filament 2 inside. The end of the cathode is coated with a compound which will emit electrons abundantly.

The electrons which are produced by the cathode are drawn toward the end of the master control grid 3 and on toward the other end of the tube. The master control grid contains four openings in its end. This allows some of the high speed electrons to pass through and thus form the four beams. The purpose of the master control grid is to form the four beams and to control the intensity of the picture.

After the beams pass through the master control grid 3 they pass through the accelerating electrode 4. The electrode also has four openings in it to allow the four beams to pass. The purpose of this electrode is to provide the electrons in the beams with the necessary speed and to regulate the size of the beams.

After leaving the accelerating electrode 4 the beams enter the separator 5. The separator consists of a box like outer structure 5 and an inner structure 6 which divides it into four equal sections. The inner structure is insulated from the outer structure. Each of the four beams passes through the center of one of the four sections. When the inner structure is held at the same potential as the cathode 1 and the outer structure is supplied with a positive charge, the four beams diverge and are pulled toward the outside corners of the separator. The purpose of the separator is to separate the four beams so that they can pass through the succeeding elements of the tube and to allow them to trace a larger picture.

The inner structure 7 is always kept at a negative potential with respect to the electron beams and the outer structure is always kept positive with respect to the beams. This will cause the electron beams to be repelled by the inner structure and traveling through the separator bounded by *a* and *b* of the inner structure and *d* and *c* of the outer structure as shown in Figure 4, will be deflected in the direction of the arrows. Since *a* and *b* are at the same potential, they will repel the beam equally and as *c* and *d* are at the same potential they will attract the beam equally, causing the beam to move in the direction indicated. The net effect of the separator will be to cause the four beams to be deflected equally in the direction of the four arrows. By changing the voltage on the two structures 5 and 6 of the separator, the amount of deflection may be easily controlled.

After leaving the separator 5 and inner structure 6 each of the four beams passes through a control grid 7. The purpose of these control grids is to control the colors produced by the screens 12. At any instant when a color is not being used in the formation of the picture, the control grid which controls that color is held negative, so that the electron beam can not pass through and impinge on the screen and thus produce light. When a color is being used at that particular instant the signal corresponding to the color is impressed upon its control grid which drives the control grid positive. The degree to which the control grid is driven positive is dependent upon the amplitude of the incoming signal, therefore, the intensity of the beam after leaving the control grid is dependent upon the degree to which the grid was driven positive. Thus the intensity of any color at any instant being reproduced at the receiver is in proportion to the intensity of that particular color being scanned by the transmitting camera. Any primary color or any combination of one or more of these colors may be produced or combined at the receiver to form any shade of any color as a faithful reproduction of the object being televised.

When any one or more of the control grids 7 is driven positive the one or more beams which pass through these control grids are allowed to continue on their path toward the end of the tube. Each of the beams which is allowed to pass then enters a focusing electrode. The focusing electrode consists of the two sections 8 and 9. The purpose of this electrode is to shape the beam so that when it strikes the screen 12 it will be focused to a point and thus form a clear and sharp picture. The focusing is accomplished by connecting the section 9 to a constant voltage source and the section 8 to a variable voltage source. The voltage on 8 is then varied until the electric fields within the electrode cause the beam to converge and reach a point of focus just as they impinge upon the screen 12.

Each of the one or more beams after leaving their respective focusing electrodes passes through two pairs of deflection plates 10. One pair of vertical deflection plates and one pair of horizontal deflection plates. All four of the top vertical deflection plates are connected together as are the four bottom vertical deflection plates and the four left horizontal deflection plates are connected together as are the four right horizontal deflection plates. The purpose of this is so that when voltage is applied to one plate of one beam it is also applied to the other three similar plates of the other three beams. By connecting similar plates of the four beams the beams are locked together so that when one beam moves the other three beams move, and therefore, the four beams are kept in step with each other and the television camera. The four beams are caused to sweep their screens by supplying the bottom vertical deflection plates and the right horizontal deflection plates with a saw-tooth voltage generated by a saw-tooth oscillator within the receiver. The beams are kept in exact step with the transmitter by synchronizing pulses which are sent out on the video signal and control the saw-tooth oscillators. In this system it is necessary that each of the three primary colors contain vertical impulses and horizontal synchronizing impulses because no one of the colors is in use at all times and the beams can get out of step if the synchronized impulses are not continued.

Blanking signals are also sent out on the video signals and are applied to the respective control grids 7 with the color video signals. These blanking signals drive the control grids negative and blank out the beams when they retrace across the screen in order to trace another frame of the picture. The purpose of the blanking signals is to prevent the beams to impinge on the screen during the retrace periods. If the blanking signals were not applied to the control grids the retraces would show up on the screens and interfere with the pictures.

After leaving the deflection plates each of the beams impinges on a fluorescent screen where the electrical energy is converted into light energy. The screens 12 are made up of material which will fluoresce the three primary colors and pure white, each screen a different color. The screens are mounted on the surface of a lens 13 which is ground so that the light from each of the screens is superimposed on the back of a translucent screen 14. The colors recombine on the back of the translucent screen and the fully colored reproduction of the image being televised is viewed on the outside end 15 of the tube or envelope 16.

Figure 7:
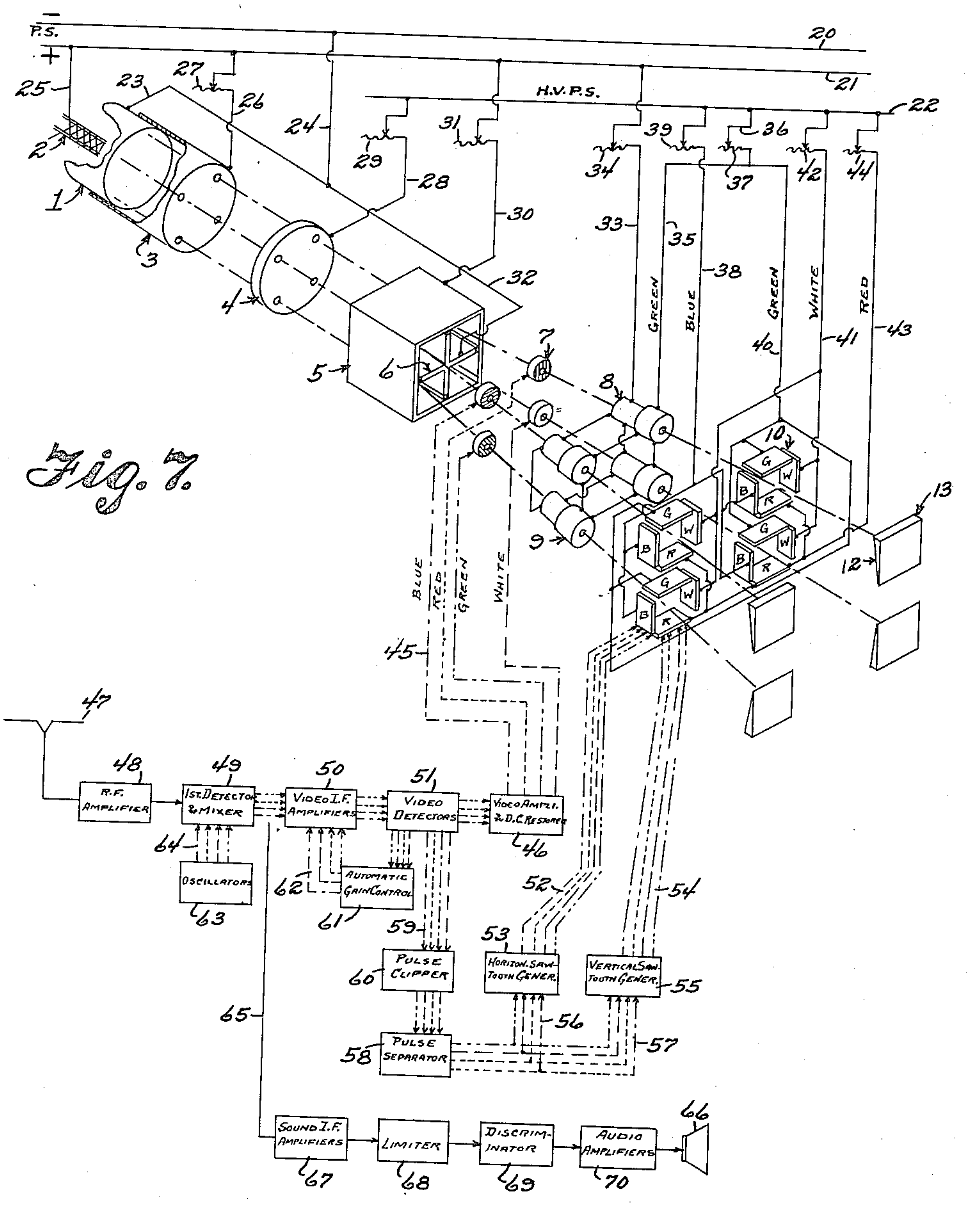
Figure 7 is a diagrammatic view illustrating the relative positions of the elements with suitable wiring diagrams provided therefor.

The elements are connected to power supply lines 20 and 21 and also to a high voltage power supply 22 is shown in Figure 7. The cathode 1 is connected by wires 23 and 24 to the wire 20 and the heater filament 2 is connected by a wire 25 to the wire 21. The master control grid 3 is connected by a wire 26 to the wire 21 through a variable resister 27. The accelerating electrode 4 is connected to the wire 22 by a wire 28 also having a variable resister 29 therein and the outer structure 5 of the separator is connected by a wire 30 through a resister 31 to the wire 21 with the inner structure 6 of the separator connected by a wire 32 through the wire 20 to the wire 24.

The variable section 8 of the focusing electrode is connected by a wire 33 to the wire 21 through a resister 34 and the stationary section 9 of the focusing electrode is connected by a wire 35 through the wire 22 to a wire 36 with a resister 37 therein. The vertical sections of the deflector plates on one side are connected by wires to the high voltage power supply wire 22 through the wire 38 with the resister 39 therein and the upper horizontal sections are connected by the wires 40 to the wire 22 through the wire 36 and resistance 37. The opposite vertical sections of the deflector plates are connected by the wires 41 through the wire 22 to the resistance 42 and the lower horizontal sections are connected by the wire 43 through the high voltage supply power supply wire 22 to the resistance 44.

The second control grids 7 are connected by the wires 45 to the video amplifiers and D. C. restorer 46 and the video amplifiers and D. C. restorer are connected to antenna 47 through the R. F. amplifier 48, 1st detector and mixer 49, video I. F. amplifiers 50 and video detectors 51, as shown in Figure 7.

The deflection plates 10 are connected by the wires 52 to the horizontal saw tooth generator 53 and by the wires 54 to the vertical saw tooth generator 55. The generators 53 and 55 are connected by the wires 56 and 57, respectively to the impulse separator 58, and the impulse separator 58 is connected by the wires 59 to the video detectors 51 through the impulse clipper 60. An automatic gain control 61 is connected across the video I. F. amplifiers and video detectors by wire 62 and oscillators, as indicated by the numeral 63 are connected to the first detector and mixer 49 by wires 64.

The first detector and mixer 49 is connected by a wire 65 to a loudspeaker 66 through sound I. F. amplifiers 67, a limiter 68, a discriminator 69 and audio amplifiers 70.

It will be understood that these circuits are only illustrative and the parts may be connected in any suitable manner or by any means.

Although this tube is disclosed and described as particularly adapted for a color television receiver it will be understood that it may also be used for a color television transmitter with slight changes in the parts thereof.

It will also be understood that the cathode ray tube of this application is used for both transmission and reproduction, the tubes for both purposes being exactly alike except for the fluorescent screen and lens 13 as in the transmission tube these screens are replaced by four light sensitive plates on which the light reflected from the object being televised is focused and these plates become charged and are neutralized by the four cathode ray beams which scan the backs of the plates. The light is focused on the plates by four lens systems on the front of the camera, one system containing a blue filter, one a red filter, one a green filter, and the other a clear filter. These filters allow only light rays to pass that are of the same color as the filter and in this way any shade of any color is broken down into the primary colors in three of the lens systems and in the one which contains a clear filter all of the colors are allowed to pass so that a signal may be formed which will produce a black and white picture in those receivers not capable of color reproduction.

The use of light sensitive plates in color television is old and the use of optical means at the transmitter for projecting a plurality of images in different colors into the tube with a similar optical means at the receiver is conventional as stated in Patent Number 2,389,646.

It will be understood that modifications may be made in the design and arrangement of the parts without departing from the spirit of the invention.

What is claimed is:

1. In a color television system comprising an electron tube having a target based upon a quasi-focal plane adapted to be impacted by an electron beam substantially focused thereat, groups of deflection plates spaced from and positioned to coact with the quasi-focal plane of the tube, groups of focusing and beam shaping elements spaced from and aligned with said deflection plates, a group of color control grids providing a plurality of selected component colors for producing additive color images positioned to coact with the focusing electrodes and deflecting plates, means for developing a plurality of electron scanning beams and for directing the resultant electron beams upon the target areas, means for scanning the target areas by the separately produced electron scanning beams, and means for restricting the scanning of the target by the separate electron scanning beams.

2. In a color television system comprising an electron tube having a target based upon a quasi-focal plane adapted to be impacted by an electron beam substantially focused thereat, groups of deflection plates spaced from and positioned to coact with the quasi-focal plane of the tube, groups of focusing and beam shaping elements spaced from and aligned with said deflection plates, a group of color control grids providing a plurality of selected component colors for producing additive color images positioned to coact with the focusing electrodes and deflecting plates, means for developing electron scanning beams, a separator having a plurality of longitudinally disposed passages therethrough for dividing said electron scanning beams into the plurality of beams and for directing the resultant electron beams upon the target areas, means for scanning the target area by the separately produced electron scanning beams, and means for restricting the scanning of the target by the separate electron scanning beams.

3. In a color television system comprising an electron tube having a target based upon a quasi-focal plane adapted to be impacted by an electron beam substantially focused thereat, groups of deflection plates spaced from and positioned to coact with the quasi-focal plane of the tube, groups of focusing and beam shaping elements spaced from and aligned with said deflection plates, a group of color control grids providing a plurality of selected components colors for producing additive color images positioned to coact with the focusing electrodes and deflecting plates, means for developing a plurality of electron scanning beams and for directing the resultant electron beams upon the target areas, said developing means including a separator having a plurality of longitudinally disposed passages therethrough, an accelerating electron, a master control grid and a heater filament, means for scanning the target areas by the separately produced electron scanning beams, and means for restricting the scanning of the target by the separate electron scanning beams.

FRANK M. WOOD, Jr.

References Cited in the file of this patent

UNITED STATES PATENTS

| Number | Name | Date |
|---|---|---|
| 2,083,203 | Schlesinger | June 8, 1937 |
| 2,170,944 | Glass | Aug. 29, 1939 |
| 2,294,820 | Wilson | Sept. 1, 1942 |
| 2,389,645 | Sleeper, Jr. | Nov. 27, 1945 |
| 2,389,646 | Sleeper, Jr. | Nov. 27, 1945 |
| 2,480,848 | Geer | Sept. 6, 1949 |